US010121579B2

(12) United States Patent
Pablo Curto et al.

(10) Patent No.: US 10,121,579 B2
(45) Date of Patent: Nov. 6, 2018

(54) SAFETY VALVE ADAPTED FOR A COOKING APPLIANCE (71) Applicant: ORKLI, S. COOP., Ordizia (ES)

(72) Inventors: Marcos Pablo Curto, Hernani (ES); Andoni Unanue Imaz, Idiazabal (ES)

(73) Assignee: ORKLI, S. COOP., Ordizia (ES)

(*) Notice: Subject to any disclaimer, the term of this patent is extended or adjusted under 35 U.S.C. 154(b) by 0 days.

(21) Appl. No.: 15/465,195

(22) Filed: Mar. 21, 2017

(65) Prior Publication Data
US 2017/0278611 A1 Sep. 28, 2017

(30) Foreign Application Priority Data

Mar. 23, 2016 (EP) .................... 16382133

(51) Int. Cl.
H01F 7/08 (2006.01)
H01F 7/16 (2006.01)
F16K 31/06 (2006.01)
F23N 1/00 (2006.01)
H01F 7/06 (2006.01)

(52) U.S. Cl.
CPC ....... H01F 7/1638 (2013.01); F16K 31/0655 (2013.01); F16K 31/0675 (2013.01); F23N 1/005 (2013.01); H01F 7/081 (2013.01); F23N 2035/14 (2013.01); F23N 2035/24 (2013.01); H01F 2007/062 (2013.01)

(58) Field of Classification Search
CPC . H01F 7/08; H01F 7/16; H01F 7/1638; H01F 3/00
USPC .......................................... 335/220
See application file for complete search history.

(56) References Cited

U.S. PATENT DOCUMENTS 4,127,835 A * 11/1978 Knutson ............... H01F 7/1615
310/30
5,050,840 A * 9/1991 Kondo .................. H01F 7/1607
251/129.08
(Continued)

FOREIGN PATENT DOCUMENTS

ES 2120830 A1 11/1998
ES 2155013 A1 4/2001
(Continued)

Primary Examiner — Shawki S Ismail
Assistant Examiner — Lisa Homza
(74) Attorney, Agent, or Firm — Edell, Shapiro & Finnan, LLC (57) ABSTRACT According to one implementation a gas safety valve is provided that includes a reel onto which a coil is wound, the coil including a phase wire and a grounding wire. The reel has an elongated projection having first and second electrical contact areas onto which the phase wire and grounding wire are respectively arranged. The gas safety valve further includes an electromagnet having a core that is at least partially housed in an internal cavity of the reel. The safety gas valve also includes a support and a phase connector. The first electrical contact area is arranged such that it is inserted in the phase connector and the second electrical contact area is arranged such that it is inserted in the support, both electrical contact areas exerting an elastic force against the phase connector and the support, respectively, assuring the electrical connection between the phase wire and the phase connector, and between the grounding wire and the support, respectively.

17 Claims, 13 Drawing Sheets

(56) References Cited

U.S. PATENT DOCUMENTS

| | | | | |
|---|---|---|---|---|
| 5,127,585 | A * | 7/1992 | Mesenich | F02M 45/08 239/585.3 |
| 5,871,201 | A * | 2/1999 | Cornea | F16K 31/0613 251/129.15 |
| 6,049,264 | A * | 4/2000 | Sailer | F01L 9/04 335/220 |
| 6,091,314 | A * | 7/2000 | Wright | F01L 9/04 251/129.15 |
| 6,157,277 | A * | 12/2000 | Bulgatz | F01L 9/04 251/129.15 |
| 6,786,467 | B2 * | 9/2004 | Gagnon | F16K 31/0603 251/129.15 |
| 7,243,680 | B2 * | 7/2007 | Golovatai-Schmidt | F01L 1/34 137/596.17 |
| 2002/0050900 | A1 * | 5/2002 | Igarashi | F02M 51/0614 335/256 |
| 2002/0093408 | A1 * | 7/2002 | Morita | H01F 7/1615 335/220 |
| 2002/0130745 | A1 * | 9/2002 | Kobow | E21D 23/16 335/220 |
| 2002/0189600 | A1 * | 12/2002 | Nydam | F02M 26/53 123/568.21 |
| 2003/0089349 | A1 * | 5/2003 | Modien | F02M 26/53 123/568.21 |
| 2003/0160671 | A1 * | 8/2003 | Koch-Groeber | F02M 63/0021 335/220 |
| 2004/0090296 | A1 * | 5/2004 | Ojima | F16K 31/0637 335/256 |
| 2005/0030136 | A1 * | 2/2005 | Babich | H01F 3/02 335/220 |
| 2006/0145545 | A1 * | 7/2006 | Reichert | F16K 31/0624 310/14 |
| 2009/0078901 | A1 * | 3/2009 | Guirado Tristan | H01F 5/04 251/129.21 |
| 2010/0117014 | A1 * | 5/2010 | Pablo Curto | F23N 1/005 251/129.01 |
| 2011/0285484 | A1 * | 11/2011 | Hoppe | H01F 7/081 335/229 |
| 2014/0375401 | A1 * | 12/2014 | Meun | H01F 7/088 335/257 |

FOREIGN PATENT DOCUMENTS

| | | |
|---|---|---|
| ES | 1085979 U | 7/2013 |
| JP | 03871237 B2 | 1/2007 |

* cited by examiner

SAFETY VALVE ADAPTED FOR A COOKING APPLIANCE

CROSS-REFERENCE TO RELATED APPLICATIONS

This application relates to and claims the benefit and priority to European Application No. 16382133.3, filed Mar. 23, 2016. European Application No. 16382133.3 is incorporated herein by reference in its entirety.

TECHNICAL FIELD

The present invention relates to a gas safety valve adapted for a cooking appliance.

BACKGROUND

Gas safety valves adapted for a cooking appliance are known, comprising an electromagnet with a fixed core, a support of the electromagnet, and a moving armature coupled to the plug and movable with respect to the electromagnet between an open valve position in which the electromagnet is energized and the moving armature is in contact with the electromagnet, and a closed valve position in which the electromagnet is not energized.

ES2155013A1 discloses a gas safety valve in which the electromagnet is built with a U-shaped core connected to the central dished washer and two multilayer windings in series, each one supported around half of an isolating reel with a semicircular section. The valve comprises means for coupling the electromagnet to a support seat of the core and to the dished washer, comprising said means two terminals projecting from a respective half of reel in the direction of the electrical connection means for the housing of the phase conductor and grounding wire. At least one of the terminals goes through the core.

ES2120830A1 discloses a valve comprising a central electrode rod introduced in a central hole, a central conductor wire connected to the central electrode rod such that it passes through the hole, extending inside the electromagnetic core, an external conductor wire soldered to the electromagnetic support and a wound coil around both arm portions of the core such that it has one end connected to the central conductor wire and the other end connected to the end conductor wire.

JP03871237B2 discloses a safety valve comprising a fixed core housed in a casing, a movable core, and a return spring actuating a shaft coupled to the plug. The valve comprises a reel with a winding, the reel including inserted therein a ground terminal and a phase terminal inserted in a base of the coil, an end of the coil being fixed in each of such terminals. The reel further includes another ground terminal fixed with an angular offset of at least 90° or more between the ground and phase terminals in which the ends of the coil are fixed.

Finally, in ES1085979U the reel comprises a part of a phase terminal and a part of a ground terminal embedded in a base of the reel, projecting from the base there is a first end of the phase terminal in which the phase conductor is fixed, a second end of the phase terminal going through the support forming a phase connector of the valve and a first end of the ground terminal in which the grounding wire is fixed, and a second end of the ground terminal fixed to the support. The reel further comprises a groove extending in the base of the reel separating the embedded parts of the phase terminal and of the ground terminal from one another.

SUMMARY OF THE DISCLOSURE

According to some implementations a safety valve is provided that comprises an electromagnet comprising a core, a reel inserted in the core and a coil supported on the reel, the coil comprising a phase wire and a grounding wire, a support of the electromagnet, and a phase connector.

The reel comprises a projection extending axially and comprising a first electrical contact area in which a segment of the phase conductor is arranged, and a second electrical contact area in which a segment of the grounding wire is arranged, in which the first electrical contact area is arranged such that it is inserted in the phase connector and the second electrical contact area is arranged such that it is inserted in the support, both electrical contact areas exerting an elastic force against the phase connector and the support, respectively, assuring the electrical connection between the phase wire and the phase connector, and between the grounding wire and the support, respectively.

A safety valve with the phase and ground connections being optimized is thereby obtained. Having to insert or imbed terminals in the reel of the electromagnet through which the phase wire and the grounding wire of the coil are soldered to the ground and to the phase connector is avoided. The phase wire and the grounding wire are fixed to the projection of the reel, and the electrical connection of each wire to the ground and to the phase conductor of the valve respectively is carried out by compression, once the projection of the reel is inserted in the seat and the phase connector of the valve. Soldering the wire of the coil to the terminals and the drawbacks thereof are avoided because the soldering jeopardizes, for example, the electrical connection of the coil of the electromagnet with the ground and the phase conductor of the valve.

In summary, the manufacture and assembly of the electromagnet and the connection thereof to ground and to the phase connector are simplified.

These and other advantages and features will become evident in view of the drawings and the detailed description.

DETAILED DESCRIPTION

Figure 1:
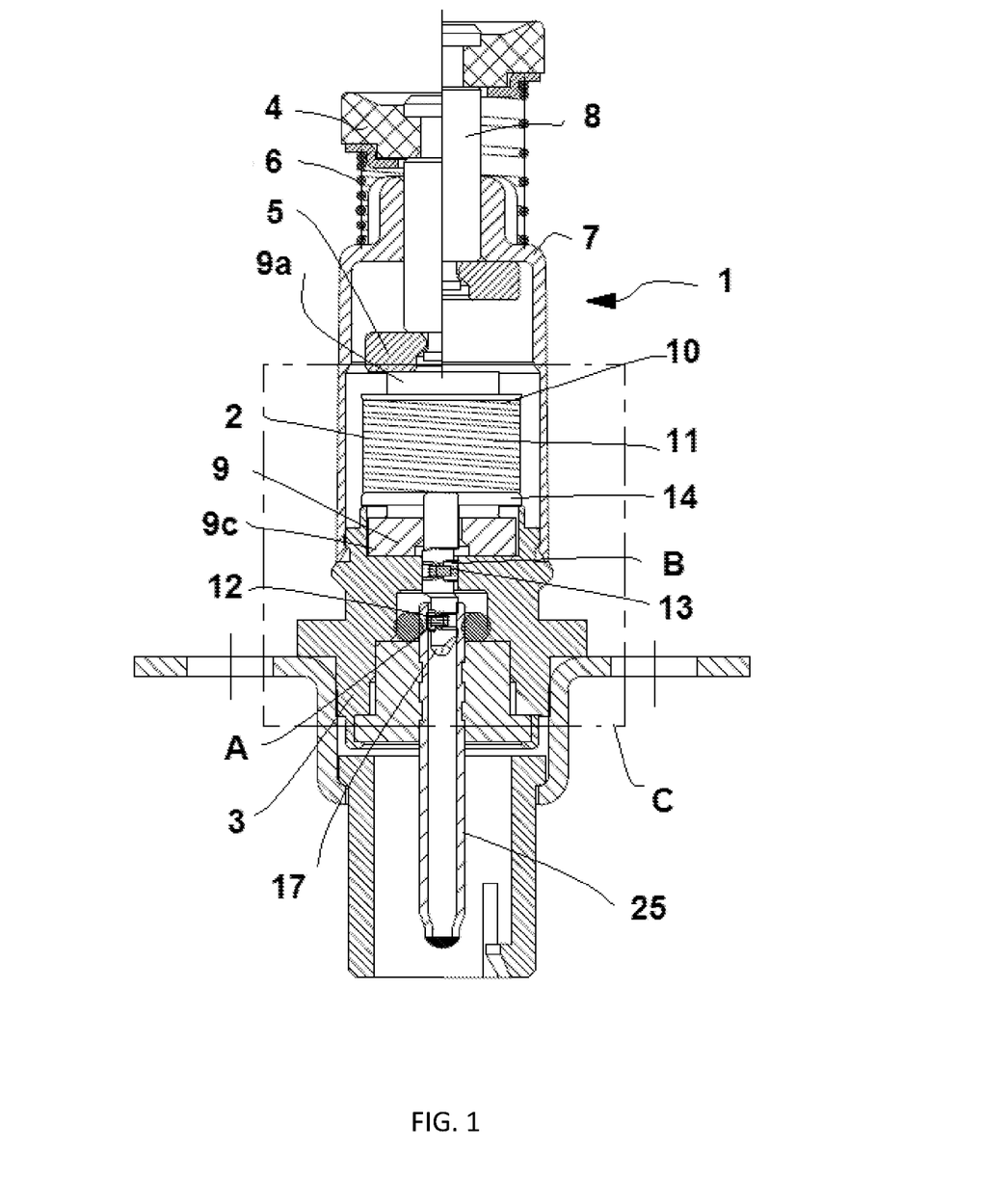
FIG. 1 shows a first side view of an embodiment of an electromagnetic valve, shown in two longitudinal halves in the two valve positions, i.e., closed and open.
Figure 4:
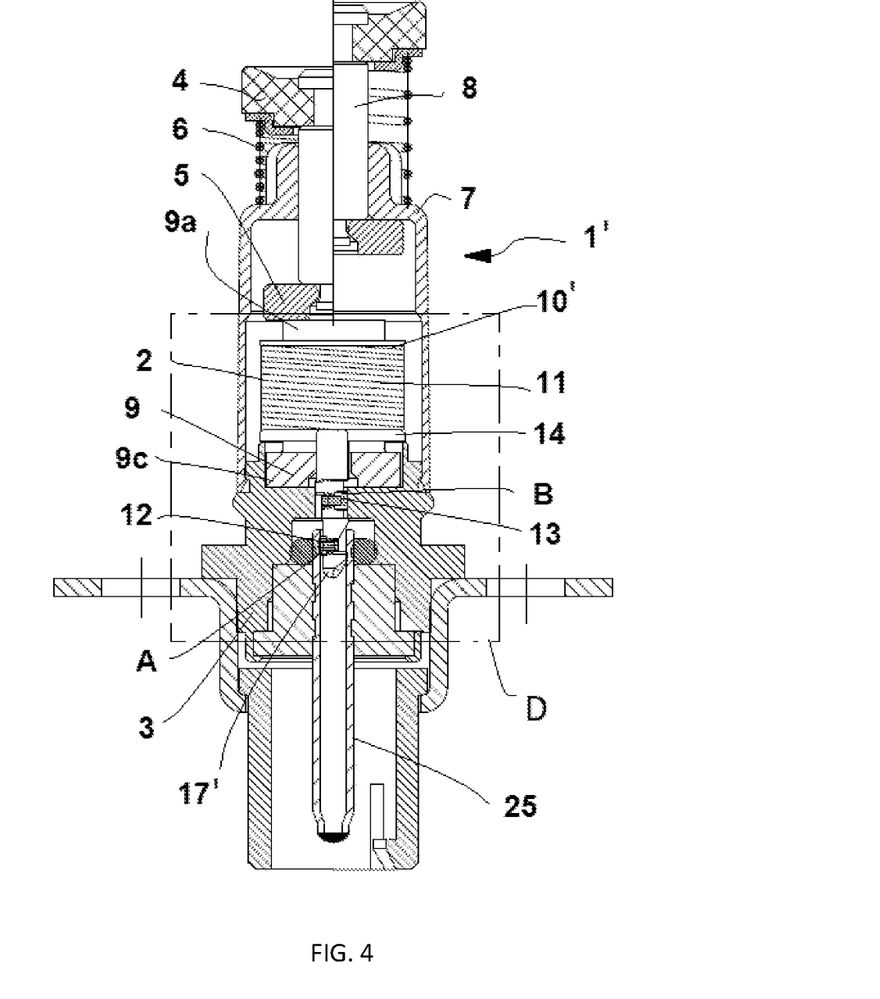
FIG. 4 is a section view of a second embodiment of an electromagnetic valve.
Figure 6:
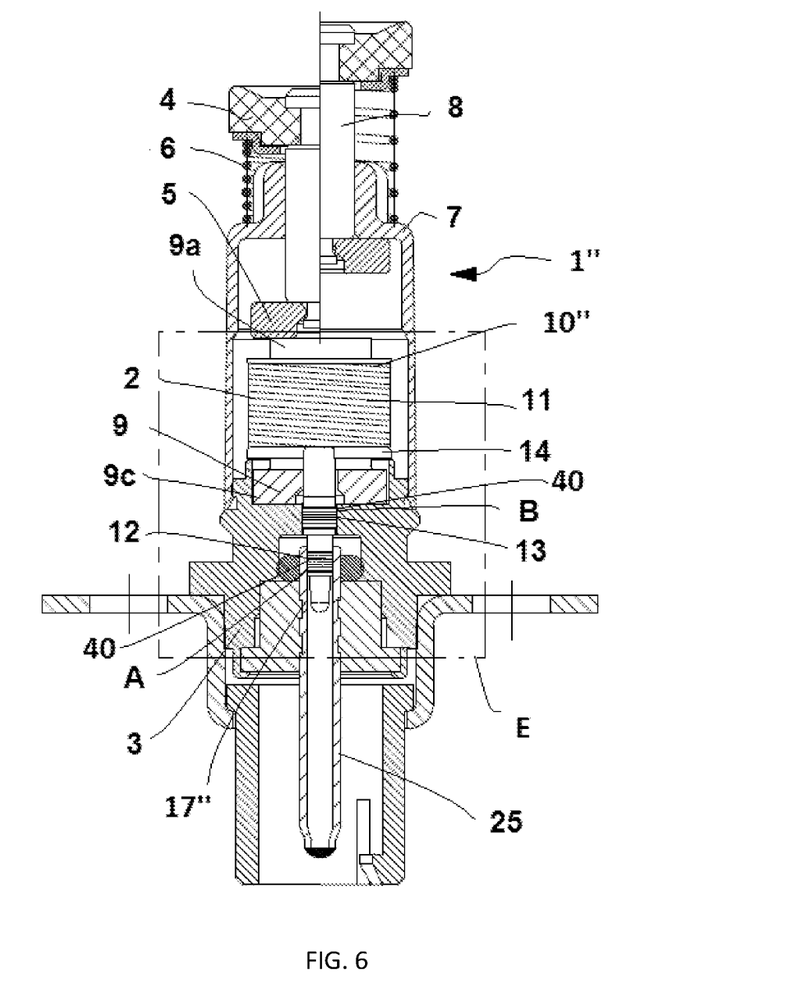
FIG. 6 is a section view of a third embodiment of an electromagnetic valve.
Figure 8:
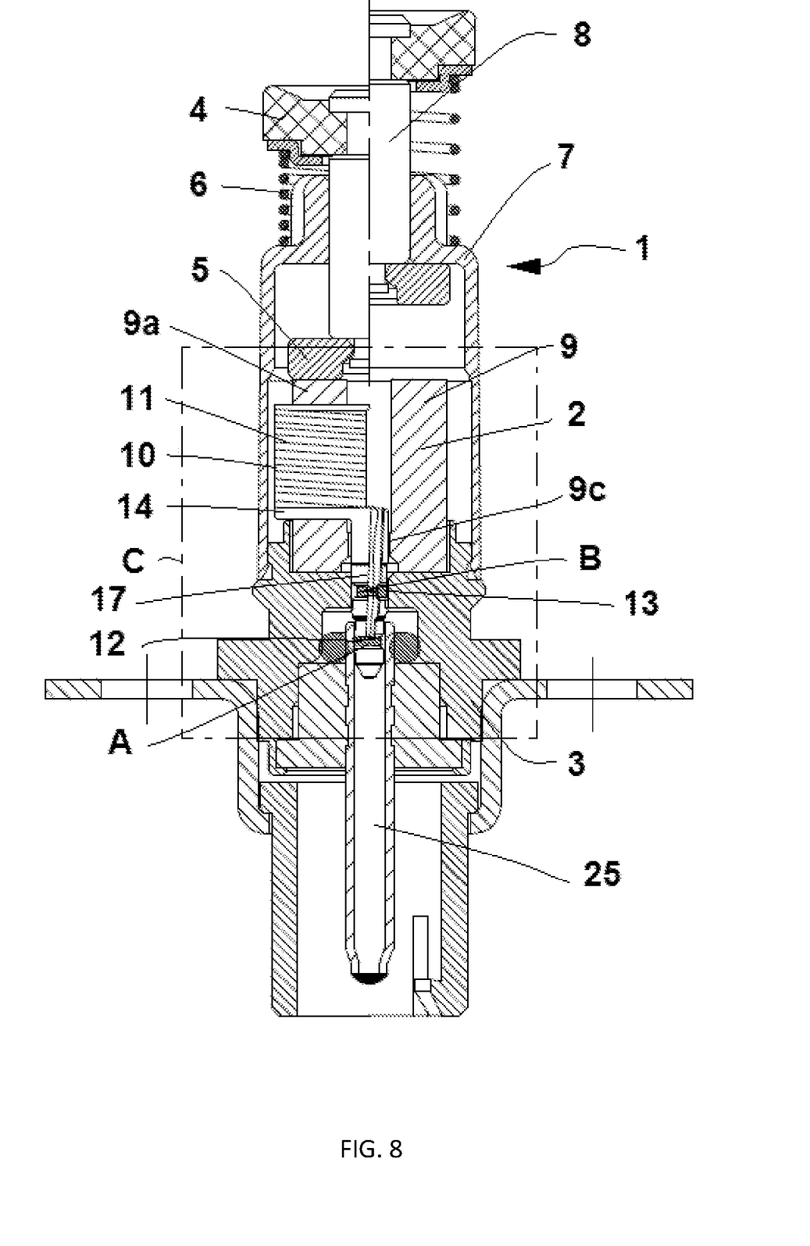
FIG. 8 is a second side view of the electromagnetic valve depicted in FIG. 1.
Figure 9:
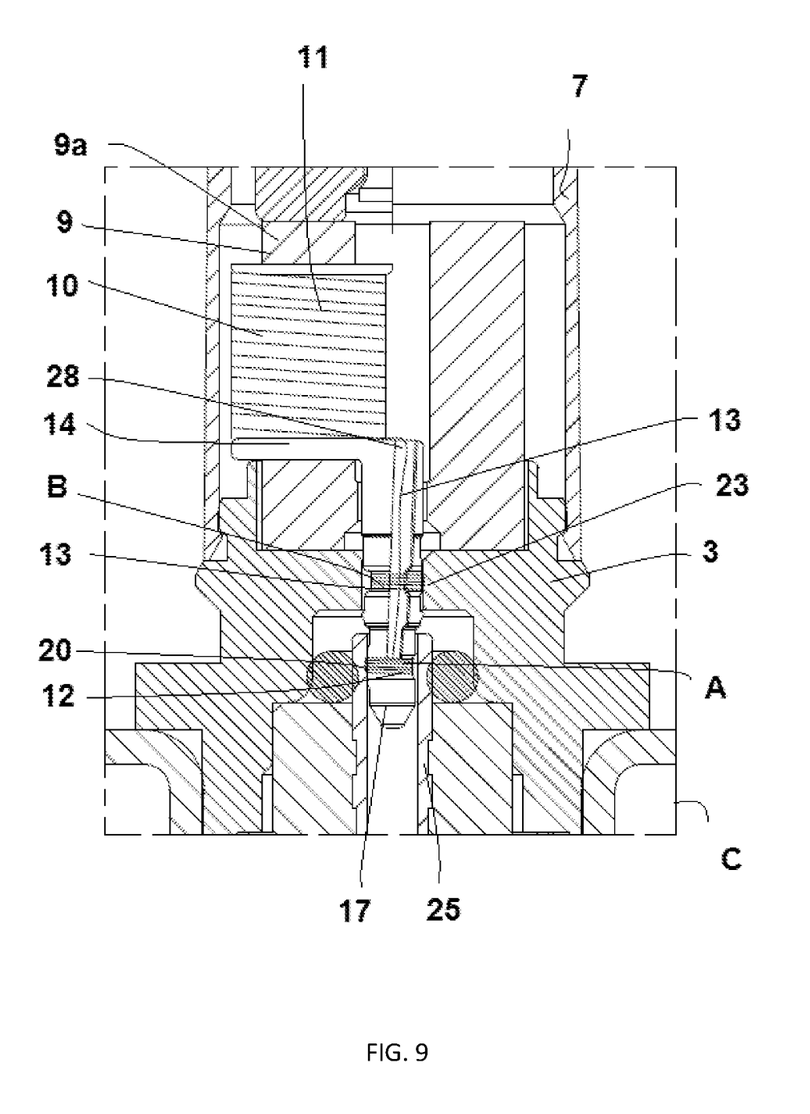
FIG. 9 shows detail C of the electromagnetic valve shown in FIG. 8.
Figure 10:
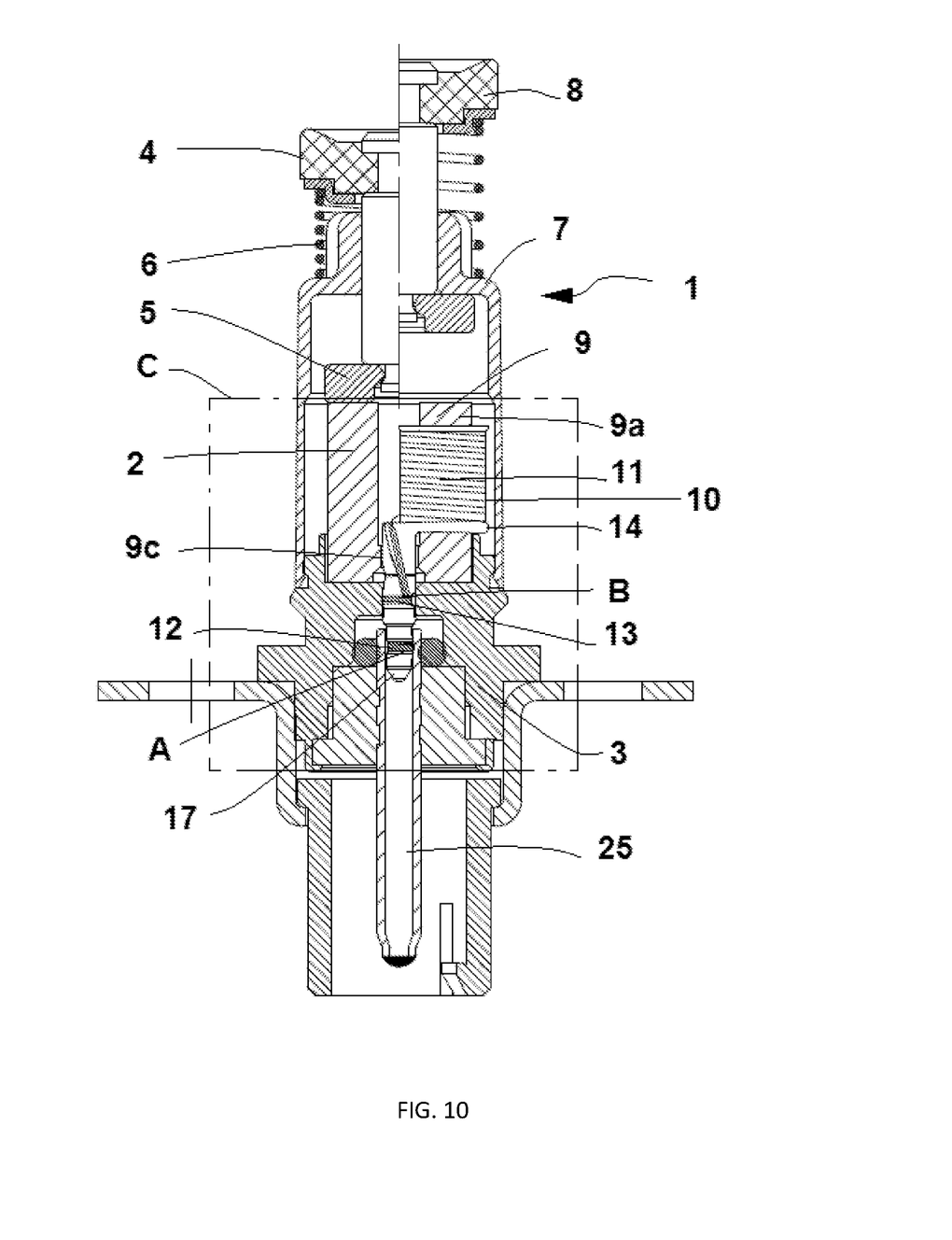
FIG. 10 is a third side view of the electromagnet valve depicted in FIG. 1.
Figure 11:
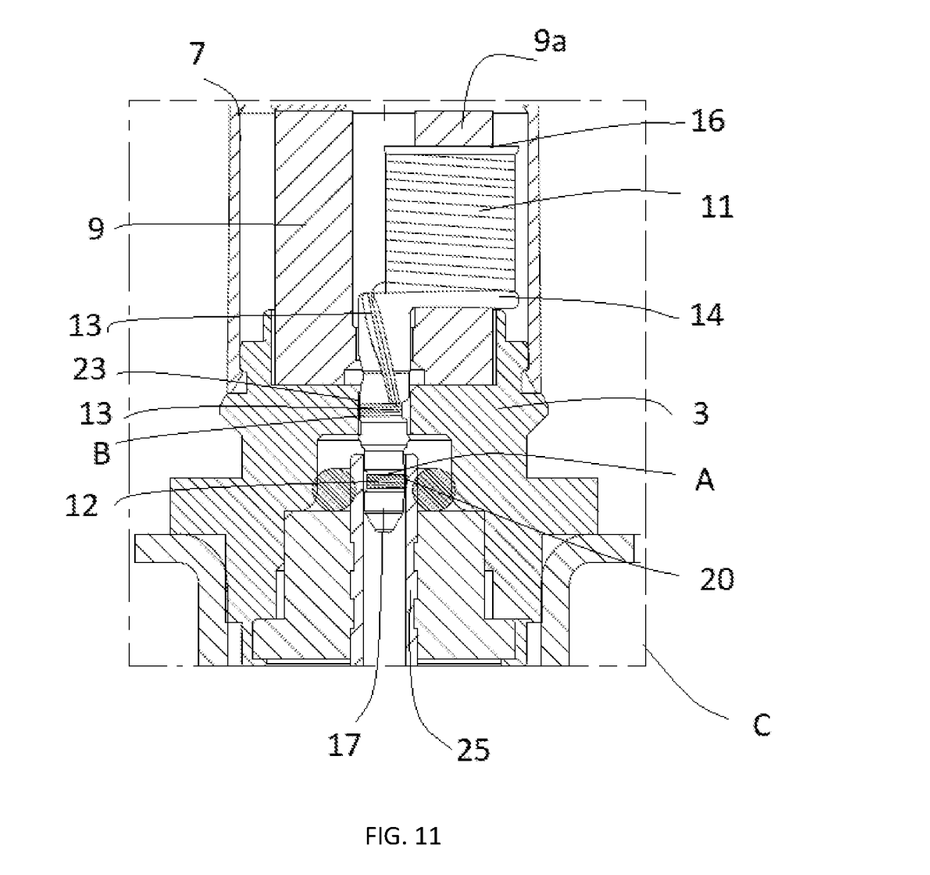
FIG. 11 shows detail C of the electromagnetic valve shown in FIG. 10.

FIGS. 1, 4 and 6 show an electromagnetic safety valve 1; 1'; 1" adapted for gas appliances which allows or blocks the passage of gas to a burner of a home appliance. FIGS. 8-10 show different side and detail views of the electromagnetic safety valve shown in FIG. 1. The electromagnetic valve 1; 1'; 1" comprises an electromagnet 2 supported in a support 3 or seat, a phase connector 25, a plug 4, a moving armature 5 coupled to the plug 4 and movable between a position corresponding to the open valve position (shown on the left side of FIGS. 1, 4 and 6) and a position corresponding to the closed valve position (shown on the right side of FIGS. 1, 4 and 6), and a spring 6 suitable for returning the plug 4 together with the moving armature 5 to the closed valve position. The electromagnetic valve 1; 1'; 1" further comprises a casing 7 enclosing therein the electromagnet 2, the moving armature 5 and partially the support 3.

The plug 4 is arranged such that it is coupled to the moving armature 5 through a rod 8. The plug 4 is configured for being moved when pushed and keeping the moving armature 5 attracted by the electromagnet 2 when the latter is energized, opening the gas passage to a position in which the moving armature 5 comes into contact with the electromagnet 2 (open valve position shown on the left side of FIGS. 1, 4 and 6). When the electromagnet 2 is no longer energized, the spring 6 acts on the plug 4, moving it together with the moving armature 5 to the closed valve position (shown on the right side of FIGS. 1, 4 and 6), closing the gas passage.

The electromagnet 2 comprises a core 9 supported in the seat 3, a reel 10; 10';10" which is arranged such that it is inserted in the core 9, and a coil 11 which is arranged such that it is coiled on the reel 10; 10'; 10". The core 9 may have a U-shaped geometry defined by two arms attached through a base 9c. The reel 10; 10'; 10" is arranged such that it is inserted in one of the arms of the core 9. The core 9 and moving armature 5 are made of ferromagnetic materials. The support 3 is made of a preferably metallic electrically conductive material, whereas the reel 10; 10'; 10" is made of an electrically isolating material, preferably plastic.

Figure 2A:
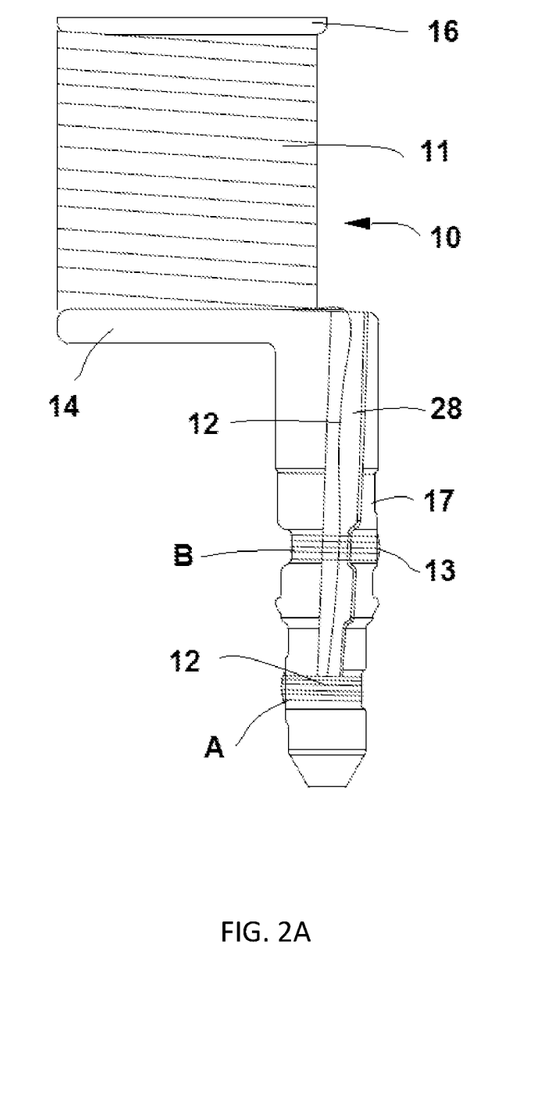
FIGS. 2A, 2B and 2C show different side views of the reel of the electromagnetic valve shown in FIG. 1.
Figure 2B:
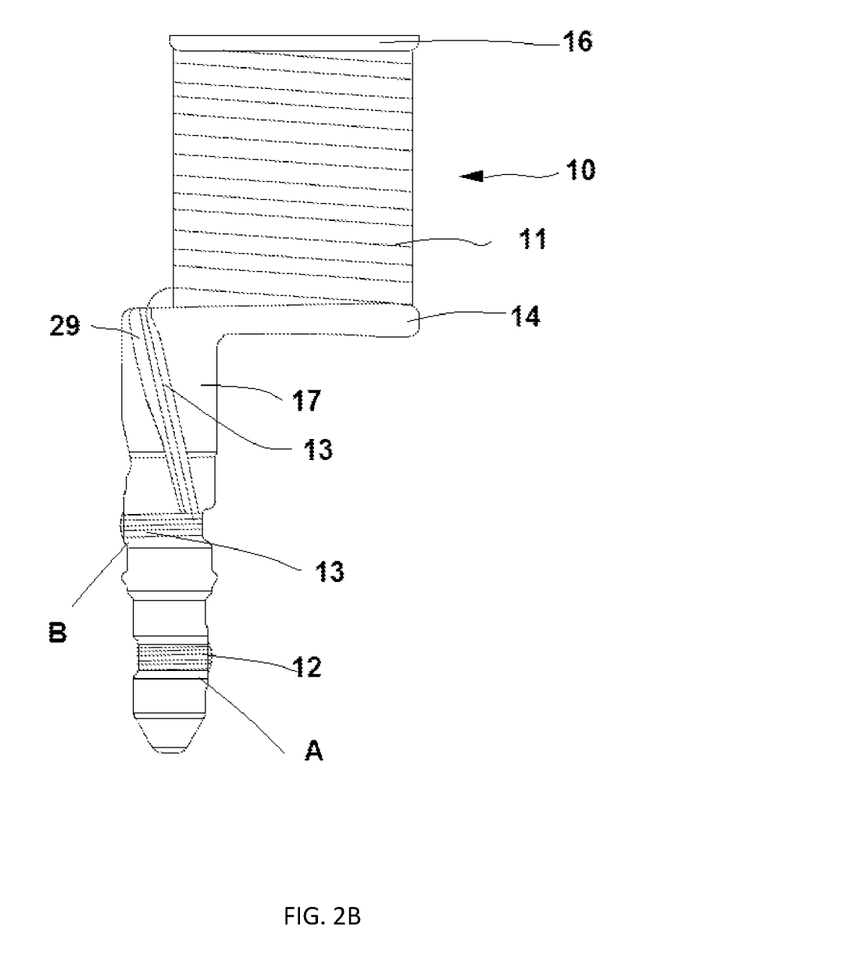
Figure 2C:
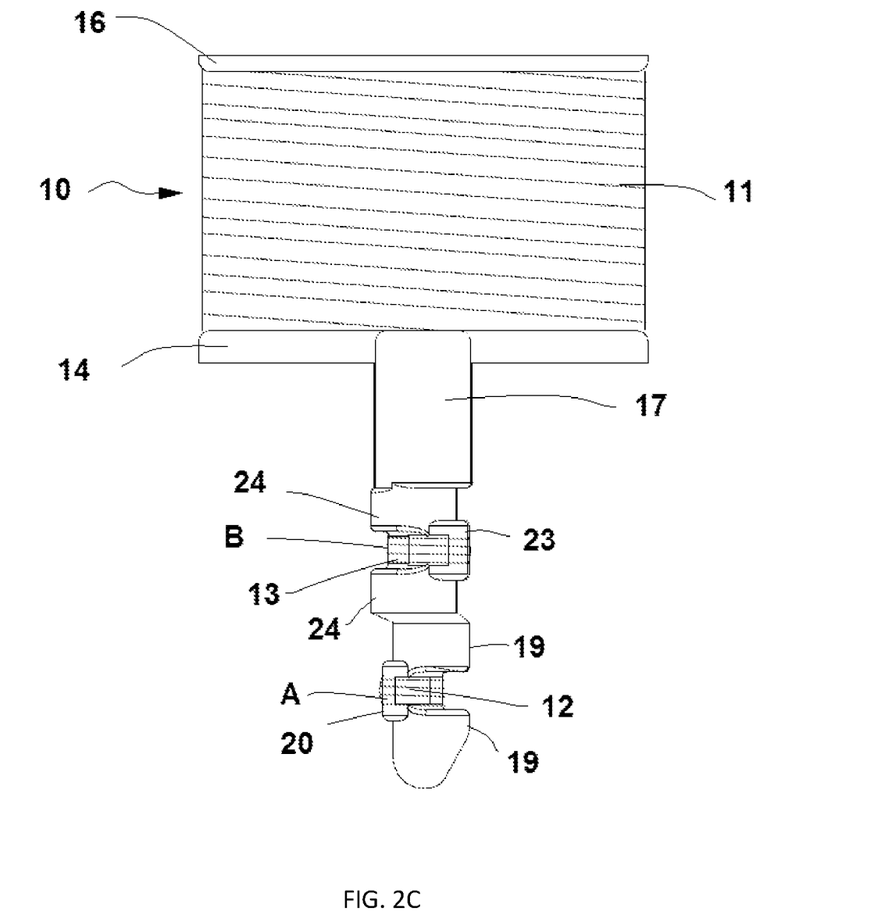

As shown in FIGS. 2A, 2B and 2C, the reel 10; 10'; 10" comprises a projection 17; 17'; 17" extending axially from a base 14 of the reel and comprising a first electrical contact area A in which a segment of the phase wire 12 is arranged, and a second electrical contact area B in which a segment of the grounding wire 13 is arranged. Both the first electrical contact area A and the second electrical contact area B are arranged such that they are inserted compressed respectively against the phase connector 25, electrically connecting the phase wire 12 with the phase connector 25, and against the support 3 electrically connecting the grounding wire 13 with the support 3. Both electrical contact areas A and B exert a constant elastic force against the phase connector 25 and the support 3, respectively, assuring the electrical connection between the phase wire 12 and the phase connector 25, and between the grounding wire 13 and the support 3.

In turn, the reel 10; 10'; 10" comprises a base 14 and a hollow tubular body 15 extending continuously and orthogonally from the base 14, and one of the arms 9a of the core 9 goes through it. The projection 17; 17'; 17" extends from the base 14, in the longitudinal direction of the valve 1, going through the base 9c of the core 9 and the support 3. The reel 10; 10'; 10" further comprises a flange 16 at the end of the tubular body 15 opposite the base 14, so that the coil 11 is arranged such that it is wound on the tubular body 15 between the base 14 and the flange 16.

In the embodiments shown in the drawings, the projection 17; 17'; 17" is rod-shaped, a segment of the phase wire 12 and a segment of the grounding wire 13 being arranged such that they are wound around the projection 17; 17'; 17", particularly around the first electrical contact area A and the second electrical contact area B of the projection 17; 17'; 17", respectively, the first electrical contact area A and the second electrical contact area B projecting radially with respect to the projection 17; 17'; 17", at least along part of its path.

Figure 3:
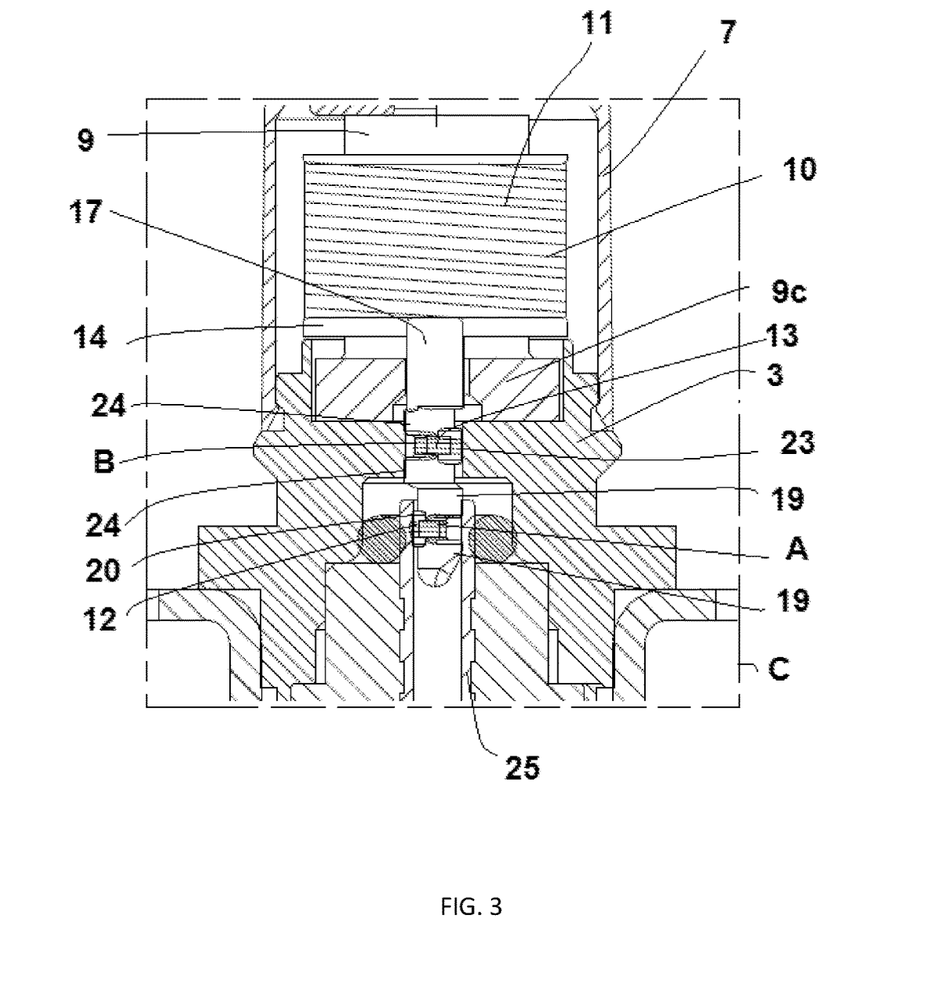
FIG. 3 shows detail C of the electromagnetic valve shown in FIG. 1.
Figure 5:
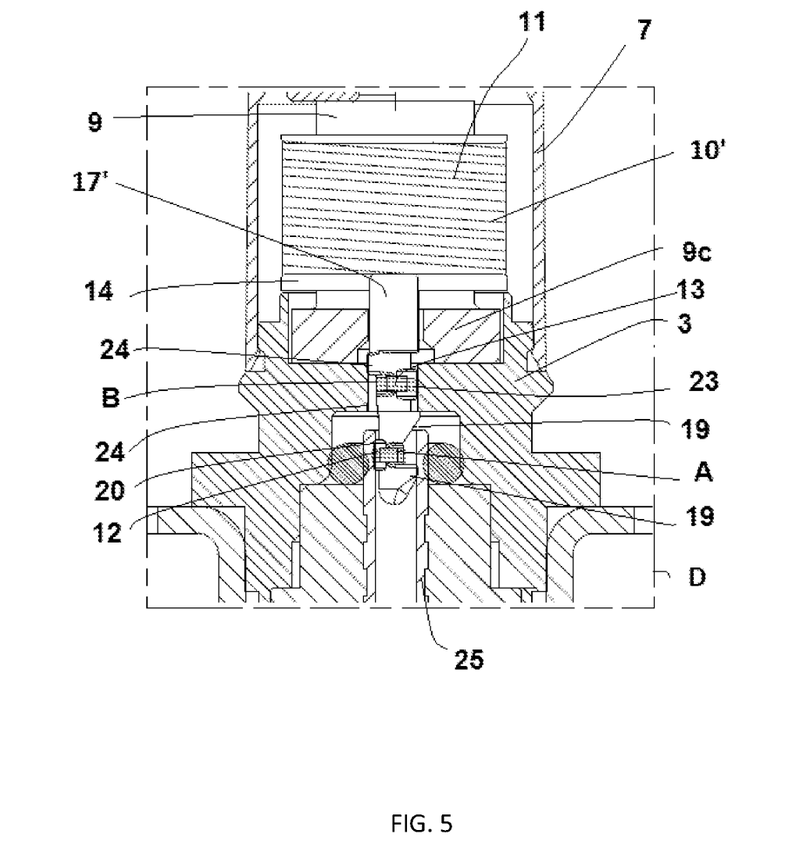
FIG. 5 shows detail D of the electromagnetic valve shown in FIG. 4.

In both the first embodiment shown in FIGS. 1 to 3 and the second embodiment shown in FIGS. 4 and 5, the first electrical contact area A and the second electrical contact area B are arranged in an eccentric manner with respect to the axial axis of the projection 17. Both electrical contact areas A and B may be arranged such that they are diametrically opposed. The arrangement of the electrical contact areas A and B so that they are not aligned with one another and are off-centered with respect to the axial axis of the projection 17 allows the projection 17 to exert a constant elastic force against the seat 3 and against the phase connector 25 when said projection 17 is inserted in the seat 3 and in the phase connector 25, respectively, compressing the electrical contact areas A and B against the seat 3 and the inside of the phase connector 25, respectively. A good electrical connection between the phase wire 12 and the phase connector 25, and the grounding wire 13 and the seat 3, is thereby assured.

In the first embodiment, the projection 17 comprises a first protuberance 20 in the first electrical contact area A in which the segment of the phase wire 12 is arranged wound around same, and a second protuberance 23 in the second electrical contact area B in which the segment of the grounding wire 13 is arranged wound around same, said protuberances 20 and 23 projecting radially. Said first and second protuberances 20 and 23 are compressed against the phase connector 25 and the seat 3, respectively.

In this first embodiment, the projection 17 may further comprise in each electrical contact area A and B a pair of additional protuberances 19 and 24, such that said pair of additional protuberances 19 and 24 are arranged such that they are diametrically opposed with respect to the first protuberance 20 and the second protuberance 23, respectively, upstream and downstream of the first protuberance 20 and second protuberance 23, respectively. The segment of the phase wire 12 and the segment of the grounding wire 13 wound around the first protuberance 20 and of the second protuberance 23, respectively, are thereby arranged such that they fit between each pair of corresponding additional protuberances 19 and 24, respectively, the risk of the segments of grounding wire and phase wire sliding along the projection 17 and contacting one another being eliminated. In addition, the additional protuberances 19 and 24 are arranged compressed against the phase connector 25 and against the seat 3, respectively, exerting together with the first protuberance 20 and with the second protuberance 23 a constant elastic force against the seat 3 and against the phase connector 25.

In addition, the projection 17 comprises guides 28 and 29 of the phase wire 12 and of the grounding wire 13, as shown in FIG. 3. In addition to avoiding electrical contact between wires 12 and 13, the risk of the pwires 12 and 13 breaking due to friction against the walls of the core 9 and of the support 3 is thereby minimized. The guides 28 and 29 are arranged in a symmetrical manner in the projection 17 and each of them comprises a groove axially going through the projection 17, particularly the base 14 of the reel 10.

In the second embodiment shown in FIGS. 4 and 5, the projection 17' comprises in each electrical contact area A and B a respective additional protuberance 19 and 24. The additional protuberances 19 and 24 are arranged such that they are diametrically opposed with respect to the first protuberance 20 and second protuberance 23, respectively, and with respect to one another. Said additional protuberances 19 and 24 are arranged such that they are compressed against the phase connector 25 and against the seat 3, respectively, exerting together with the first protuberance 20 and with the second protuberance 23 a constant elastic force against the seat 3 and against the phase connector 25.

In this second embodiment, the projection 17' also includes guides of the phase wire 12 and of the grounding wire 13, not shown in the drawings, similar to those shown in FIG. 3 corresponding to the first embodiment. Said guides have the same function described for the first embodiment. Furthermore, each guide comprises a groove axially going through the projection 17' similar to the one of the first embodiment.

Figure 7:
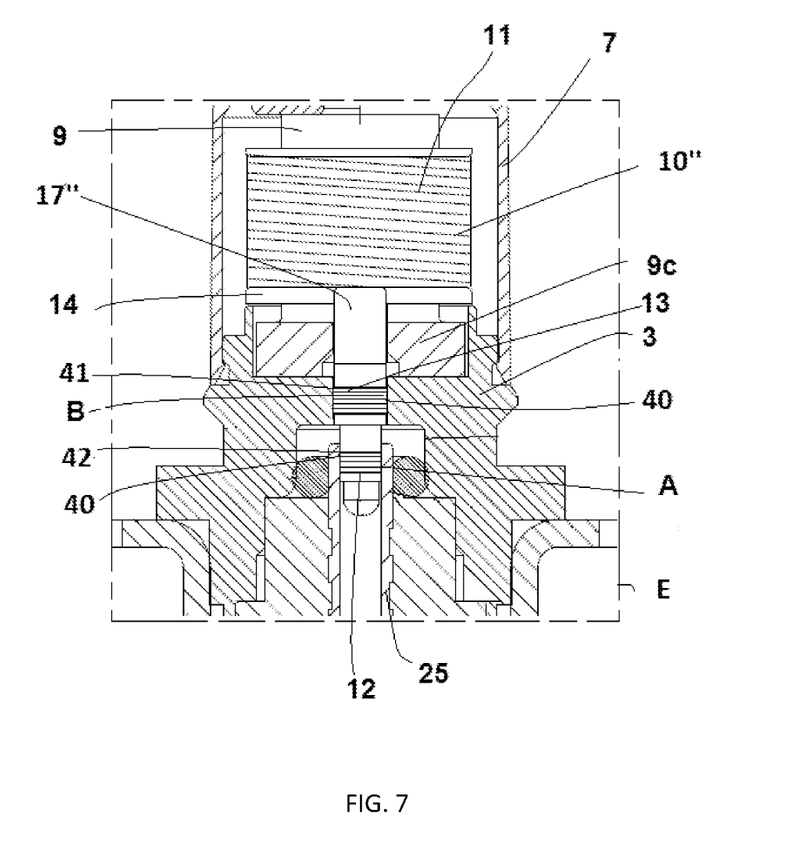
FIG. 7 shows detail E of the electromagnetic valve shown in FIG. 6.

FIGS. 6 and 7 show a third embodiment in which each electrical contact area A and B further comprises electrically conductive elastic elements 40 which are arranged such that they are coupled to the projection 17" in the first electrical contact area A and in the second electrical contact area B, respectively, of said projection 17", electrically connecting the phase wire 12 with the phase conductor 25 and the grounding wire 13 with the support 3.

Each electrically conductive element 40 has an annular geometry which is arranged such that it is inserted in the projection 17", the phase wire 12 and the grounding wire 13 being arranged respectively such that they are fixed to the respective electrically conductive element 40. The electrically conductive element 40 is preferably metallic.

In this embodiment, an electrically conductive element 40 is arranged such that it is inserted around a first recess 41 included in the projection 17", the grounding wire 13 being arranged such that it is fixed to said electrically conductive element 40, and another electrically conductive element 40 is arranged such that it is inserted around a second recess 42 included in the projection 17", the phase wire 12 being arranged such that it is fixed to said electrically conductive element 40, both recesses 41 and 42 being arranged in a concentric manner with respect to the projection 17" and each electrically conductive element 40 being arranged partially in the corresponding recess 41 and 42. The electrically conductive elements 40 are arranged such that they are compressed against the phase connector 25 and against the support 3, respectively, electrically connecting the phase wire 12 with the phase connector 25 and the grounding wire 13 with the support 3, respectively.

In the described embodiments, both the phase wire 12 and the grounding wire 13 may be tin-plated to assure electrical contact with the phase conductor 25 and with the seat 3, respectively, or with the electrically conductive element 40.

In those cases in which, for the sake of safety, for example in oxidizing environments, electrical contact of the phase wire 12 with the phase conductor 25 or with the electrically conductive element 40, and of the grounding wire 13 with the support 3 or with the electrically conductive element 40 is to be assured, the valve 1 can be introduced in a soldering furnace such that the electrical contacts are soldered.

Since the phase wire 12 does not go through the phase conductor 25 as occurs in the prior art, the operation of making holes in the phase conductor 25 to allow the passage of the phase wire 12 is eliminated, and the operation of soldering the end of the phase conductor 25 with the phase wire 12 is eliminated, such that manufacturing operations and the drawbacks of soldering at the end of the phase conductor 25, such as dirt, a possible gas leakage and tightness issues, are all minimized.

What is claimed is:

1. A gas safety valve comprising:
    a support,
    an electromagnet comprising a core, the electromagnet being supported on the support,
    a phase connector,
    a reel having an internal cavity through which at least a portion of the core passes, the reel comprising a projection having a first electrical contact area and a second electrical contact area; and
    a coil supported on the reel, the coil including a phase wire and a grounding wire, the phase wire being arranged in electrical contact with the first electrical contact area of the projection, the grounding wire being arranged in electrical contact with the second electrical contact area of the projection,
    wherein the first electrical contact area is arranged inserted in the phase connector and the second electrical contact area is arranged inserted in the support, the first electrical contact area exerting an elastic force against the phase connector to ensure a first electrical connection is provided between the phase wire and the phase conductor, the second electrical contact area exerting an elastic force against the support to ensure a second electrical connection is provided between the grounding wire and the support.

2. The gas safety valve according to claim 1, wherein the projection is elongated, a part of the phase wire being wound on the first electrical contact area of the projection, and a part of the grounding wire being wound in the second electrical contact area of the projection.

3. The gas safety valve according to claim 2, wherein the first electrical contact area and the second electrical contact area project radially with respect to the projection.

4. The gas safety valve according to claim 2, wherein the first electrical contact area further comprises a first electrically conductive elastic element that is arranged electrically coupled to the phase wire, the first electrically conductive elastic element electrically connecting the phase wire with the phase conductor, the second electrical contact area further comprises a second electrically conductive elastic element that is arranged electrically coupled to the grounding wire, the second electrically conductive elastic element electrically connecting the grounding wire with the support.

5. The gas safety valve according to claim 1, wherein the projection has a longitudinal axis, the first electrical contact area and the second electrical contact area being arranged in an eccentric manner with respect to the longitudinal axis of the projection.

6. The gas safety valve according to claim 5, wherein the first electrical contact area and the second electrical contact area are arranged such that they are disposed on opposite sides of the projection.

7. The gas safety valve according to claim 1, wherein the first electrical contact area further comprises a first electrically conductive elastic element that is arranged electrically coupled to the phase wire, the first electrically conductive elastic element electrically connecting the phase wire with the phase conductor, the second electrical contact area further comprises a second electrically conductive elastic element that is arranged electrically coupled to the grounding wire, the second electrically conductive elastic element electrically connecting the grounding wire with the support.

8. The gas safety valve according to claim 7, wherein each of the first and second electrically conductive elastic elements has an annular geometry and is arranged at least partially inserted in the projection in contact respectively with the phase wire and the grounding wire.

9. The gas safety valve according to claim 8, wherein the first electrical contact area and the second electrical contact area are arranged in a concentric manner with respect to a longitudinal axis of the projection.

10. The gas safety valve according to claim 1, wherein the first electrical contact area further comprises a first electrically conductive elastic element that is arranged electrically coupled to the phase wire, the first electrically conductive elastic element electrically connecting the phase wire with the phase conductor.

11. The gas safety valve according to claim 1, wherein the second electrical contact area further comprises a second electrically conductive elastic element that is arranged electrically coupled to the grounding wire, the second electrically conductive elastic element electrically connecting the grounding wire with the support.

12. The gas safety valve according to claim 1, wherein the projection comprises a first guide and a second guide in which the phase wire and the grounding wire are housed, respectively, preventing electrical contact between both wires.

13. The gas safety valve according to claim 12, wherein each of the first and second guides guide comprises a groove that extends along a length of the projection.

14. The gas safety valve according to claim 1, wherein the phase wire and the grounding wire are tin-plated in the respective first and second electrical contact areas.

15. The gas safety valve according to claim 1, wherein the projection is made of an electrically isolating material.

16. The gas safety valve according to claim 1, wherein the projection is elongated and the first electrical contact area has longitudinally spaced-apart first and second ends, the projection having a first protuberance located adjacent the first end and a second protuberance located adjacent the second end, the phase wire being wound about the first electrical contact area between the first and second protuberances.

17. The gas safety valve according to claim 1, wherein the projection is elongated and the second electrical contact area has longitudinally spaced-apart first and second ends, the projection having a first protuberance located adjacent the first end and a second protuberance located adjacent the second end, the grounding wire being wound about the second electrical contact area between the first and second protuberances.

* * * * *